(12) United States Patent
Wang et al.

(10) Patent No.: US 7,662,482 B2
(45) Date of Patent: Feb. 16, 2010

(54) ADHESION PROMOTER

(75) Inventors: Yee Yang Wang, Novi, MI (US);
Barbara J. Walter, Harper Woods, MI (US)

(73) Assignee: Dow Global Technologies, Inc., Midland, MI (US)

( * ) Notice: Subject to any disclaimer, the term of this patent is extended or adjusted under 35 U.S.C. 154(b) by 779 days.

(21) Appl. No.: 11/217,243

(22) Filed: Sep. 1, 2005

(65) Prior Publication Data

US 2006/0051605 A1    Mar. 9, 2006

Related U.S. Application Data

(60) Provisional application No. 60/606,350, filed on Sep. 1, 2004.

(51) Int. Cl.
| | | |
|---|---|---|
| *B32B 27/00* | (2006.01) | |
| *B32B 27/30* | (2006.01) | |
| *C08F 265/00* | (2006.01) | |
| *B32B 7/12* | (2006.01) | |
| *C09J 163/00* | (2006.01) | |
| *C07C 69/10* | (2006.01) | |

(52) U.S. Cl. ............... 428/522; 525/242; 123/184.61; 156/327; 156/330; 568/763

(58) Field of Classification Search ............ 428/41.5, 428/522; 156/60, 327, 330; 525/242; 123/194.61; 568/763
See application file for complete search history.

(56) References Cited

U.S. PATENT DOCUMENTS

| | | | |
|---|---|---|---|
| 3,861,973 A | | 1/1975 | Koch |
| 4,072,742 A | * | 2/1978 | Bouillon et al. .......... 424/47 |
| 5,185,184 A | * | 2/1993 | Koran et al. ............. 427/299 |
| 5,229,199 A | * | 7/1993 | Miner et al. ............. 442/135 |
| 5,298,587 A | | 3/1994 | Hu et al. |
| 5,320,875 A | | 6/1994 | Hu et al. |
| 5,433,786 A | | 7/1995 | Hu et al. |
| 5,494,712 A | | 2/1996 | Hu et al. |
| 5,837,958 A | | 11/1998 | Fornsel |
| 6,534,578 B1 | | 3/2003 | Daikai et al. |
| 6,543,404 B2 | | 4/2003 | Jones et al. |
| 6,629,847 B1 | * | 10/2003 | Satoh ..................... 434/409 |
| 6,806,330 B1 | | 10/2004 | Sonnenschein |
| 6,860,010 B2 | | 3/2005 | Jones et al. |
| 2002/0112684 A1 | | 8/2002 | Jones et al. |
| 2002/0144808 A1 | | 10/2002 | Jones et al. |
| 2002/0148427 A1 | | 10/2002 | Jones et al. |
| 2003/0024638 A1 | | 2/2003 | Jones et al. |
| 2003/0024768 A1 | | 2/2003 | Jones |
| 2006/0068147 A1 | * | 3/2006 | De Cooman et al. ....... 428/41.5 |

FOREIGN PATENT DOCUMENTS

| | | |
|---|---|---|
| EP | 0 999 027 | 5/2000 |
| EP | 1 319 693 | 6/2003 |
| WO | WO 01/44311 | 6/2001 |
| WO | WO 03/061965 | 7/2003 |
| WO | WO 2004/000511 | 12/2003 |
| WO | WO 2006/028924 | 3/2006 |

OTHER PUBLICATIONS

International Search Report dated Jan. 19, 2006 for International Application No. PCT/US2005/031201.
Written Opinion of the International Searching Authority dated Jan. 19, 2006 for International Application No. PCT/US2005/031201.

* cited by examiner

*Primary Examiner*—James Seidleck
*Assistant Examiner*—Saira Haider
(74) *Attorney, Agent, or Firm*—Dobrusin & Thennisch PC

(57) ABSTRACT

The present invention provides an improved bonding system including an adhesion promoter that may be used to help adhesively bond two or more components together. The preferred use of the present adhesion promoter is in a transportation vehicle (e.g., automobile), and more particularly in an engine assembly for use in such vehicles. The present invention includes a bonded automobile engine assembly including at least one plastic component, an adhesive that bonds the plastic component to at least one separate component, and an adhesion promoter between the adhesive and the plastic component. Fasteners for attaching components are optionally employed. In one specific example, an intake manifold including a plastic component is bonded to an engine assembly.

15 Claims, No Drawings

ADHESION PROMOTER

FIELD OF THE INVENTION

The present invention relates to an adhesion promoter employed to adhesively bond two or more components. More particularly, the adhesion promoter may be used to bond components used in a vehicle engine assembly.

BACKGROUND OF THE INVENTION

Historically, manufacturing complex parts involved the fabrication of separate components and joining the components using fasteners or welding. This tends to be labor intensive and expensive. Thus, manufacturers have turned to adhesives. Examples of technology aimed toward meeting this need (and for which the present invention also finds utility for repair or replacement) include commonly owned co-pending applications hereby incorporated by reference: Ser. No. 10/051,417 ("Adhesively Bonded Valve Cover Cylinder Head Assembly"), wherein a valve cover is adhesively bonded to an engine with an epoxy resin; Ser. No. 09/922,030 ("Adhesively Bonded Water Conductor Assembly"), wherein a water conductor assembly outlet is adhesively bonded to a hose with an epoxy resin; U.S. Publication No. 03-0024768 ("Adhesively Bonded Oil Pan Assembly"), wherein an oil pan is adhesively bonded to an engine block with an epoxy resin; and Ser. No. 09/825,721 ("Adhesively Bonded Radiator Assembly"), wherein an end tank is adhesively bonded to a heat exchanger with an epoxy resin.

Among the advantages of being able to fabricate engine components of plastic are the resultant weight savings and the ability to fabricate intricately shaped components. Additionally it is also possible to integrate plural functions into a single component, heretofore served by separate components, thereby serving also to reduce overall part count for a vehicle. An example of one such structure is shown in commonly owned co-pending application U.S. Publication no. 04-000511 "Automotive Valve Cover With Integral Positive Crankcase Ventilation" (filed May 15, 2002), wherein a valve cover is adhesively bonded to an engine with an epoxy resin, hereby incorporated by reference. Examples of suitable joints include butt joints, lap joints, tongue in groove joint or the like. Further examples are illustrated in commonly owned, U.S. Pat. No. 6,543,404 (filed Apr. 4, 2001; entitled "Adhesively Bonded Engine Intake Manifold Assembly") and U.S. Publication No. 02/0144808 (filed Apr. 4, 2001; entitled "Adhesively Bonded Radiator Assembly").

Manufacturing techniques, such as those mentioned above, that use adhesives typically require less labor and are more cost effective. However, known adhesive systems present their own drawbacks. In particular, many traditional adhesives have difficultly in bonding different materials (e.g., plastic to metal, or two different types of plastic). Adhesives that form strong bonds require special handling, have short shelf life, or require special cure conditions.

Another shortcoming of traditional adhesive methods is the operational environment of the bond. For example, adhesives that bond plastic to plastic may form a strong bond at ambient conditions, but this bond may exhibit less integrity when subjected to elevated temperatures or elevated pressures. Moreover, the presence moisture, oils, lubricants, greases, solvents or the like may also compromise the bond.

Primers or adhesion promoters have been used in the past to treat a surface to promote bonding. To be useful, such adhesion promoters must be compatible with their corresponding adhesive as well as the underlying workpiece. Thus, many adhesion promoters suffer the same problems as their adhesive counterparts. Known adhesion promoters rely on large volumes of solvent that need to be disposed or may only work in conjunction with undesirable adhesives. Many adhesion promoter-adhesive systems require heat curing, which can be a time consuming process slowing the rate of production on a factory line.

SUMMARY OF THE INVENTION

The present invention meets one or more of the above needs by providing an improved bonding system including a adhesion promoter that may be used to help adhesively bond two or more components together. The preferred use of the present adhesion promoter is in a transportation vehicle (e.g., automobile), and more particularly in an engine assembly for use in such vehicles. The present invention includes a bonded automobile assembly including at least one plastic component, an adhesive that bonds the plastic component to at least one separate component, and an adhesion promoter between the adhesive and the plastic component.

DETAILED DESCRIPTION OF THE INVENTION

The present invention may be used to promote the bonding of at least two components using an adhesive and an adhesion promoter. Specifically, the present invention may be used to promote the bonding of a plastic component to a second component, which optionally may be plastic, using an adhesive. Once bonded together, the components may form an assembly for use on, in, or as part of a transportation vehicle and more particular an assembly for use in the vehicle engine. Within the engine, the assembly may include an intake manifold, oil pan, valve cover, or the like.

While not wanting to be limited by theory, it is believed that the adhesion promoter of the present invention facilitates free radical polymerization on a plastic component, which in turn facilitates the bonding of the adhesive to the component. Furthermore, it is theorized that the adhesion promoter may also locally contribute to a reduction in crystallinity of plastic components, for facilitating bonding of the adhesive to the component.

In one preferred aspect, the adhesion promoter is provided as a dispersion of particles in a carrier fluid such as a solvent. For example, the adhesion promoter may include two portions in a solvent. The adhesion promoter is prepared and applied to at least the plastic component and preferably to all the plastic components for use in the assembly. The solvent may be evaporated by being driven off through the application of heat. Alternately, the solvent may be allowed to evaporate at ambient conditions. Combinations may also be employed.

The first portion of the adhesion promoter may include a polyhydroxy compound. By way of example, the first portion may be selected from difunctional aromatic compounds or mono-substituted aromatic compounds. A more preferred first portion includes nonsubstituted phenols and substituted phenols, and preferably, a dihydroxy phenol compound. The most preferred dihydroxy phenol is resorcinol. Alternative resorcinols include bisphenol A aliphatic diols (e.g., ethylene glycol, propylene glycol, and poly(oxypropylene) glycol), combinations thereof, or otherwise.

The second portion of the adhesion promoter preferably is selected from compounds having a relatively low viscosity, relatively low surface tension, high polarity, low molecular weight, liquid at room temperature, and combinations thereof. Low viscosity and surface tension is believed to provide the adhesion promoter with an excellent wetting of plastic surfaces, which in turn facilitates bonding of the adhesive to the component.

The second portion may include unsaturated monomers containing at least one hydroxy group. This second portion may additionally contain (meth)acrylic monomers, where (meth)acrylic refers to methacrylate monomers, acrylate monomer, or combinations thereof. Preferably, the second portion includes (meth)acrylic monomers with hydroxy functional groups. Hydroxyalkyl methacrylates are preferred where the alkyl may be a straight or branched carbon chain with one to about ten carbons, with 2-hydroxy-ethyl-methacrylate being the most preferred.

Suitable solvents include those that have a relatively low vapor pressure and evaporate readily at ambient conditions. The preferred solvent is also relatively non-toxic and inexpensive to use purchase, use and dispose of. The solvent preferably dissolves the first and second portions of the adhesion promoter.

The solvent may be an organic or inorganic solvent, with organic solvents being preferred and heteroatom functionalized organic solvents being preferred. Suitable solvents include alcohols with one to 10 carbons in a straight or branched chain. Anhydrous solvents are preferred but not required. The most preferred solvent is anhydrous ethanol, though water, methanol, propanol, isopropyl alcohol, butanol, combinations thereof, or the like may also be useful.

The adhesive of the present invention may optionally be a structural adhesive, a cure on demand material, or both. One specific adhesive is capable of curing under ambient conditions. Preferred adhesives include those that, after cure, can withstand the operating conditions of an engine (e.g., for an automotive vehicle). Preferably, such an adhesive does not decompose or delaminate at temperatures of up to about 138° C. (280° F.), more preferably up to about 143° C. (290° F.), even more preferably up to about 160° C. (320° F.) and most preferably up to about 191° C. (375° F.). Though not critical, in one embodiment, the adhesive that is employed in a joint herein has a resulting tensile strength of at least about 70 psi (about 500 kPa), more preferably about 145 psi (about 1 MPa), still more preferably about 420 psi (about 3 MPa). In some applications, such as where a structural adhesive is used, the resulting tensile strength may be as high as about 4000 psi (about 28 MPa), more preferably at least about 6500 psi (about 45 MPa), and still more preferably at least about 9000 psi (62 MPa).

Furthermore, the preferred adhesive is capable of withstanding prolonged exposure to hydrocarbon materials, calcium chloride, brake fluid, transmission fluid, glycol coolants, windshield washer solvents and the like, at the above-mentioned temperatures and the pressures to which the internal combustion engine reaches internally. In an optional embodiment, the adhesive is able to bond to other engine components, which may be metallic, ceramic, composite, plastic, or the like.

The adhesive used may be cured on application via a variety of known mechanisms including heat cure, infrared cure, ultraviolet cure, chemical cure, radio frequency cure, solvent loss cure, moisture cure, shear force application cure, although the preferred adhesive requires only exposure to ambient conditions to cure. In another embodiment, the curing of the adhesive can be delayed to constitute a cure-on-demand adhesive that requires a separate operation to cause the adhesive to begin to cure. In one embodiment this is achieved by using an encapsulated curing agent that ruptures during assembly. In another embodiment this is achieved by removing a protective coating to expose the adhesive to ambient conditions.

Compositions for possible adhesives are disclosed in a patent application titled, "Amine Organoborane Complex Polymerization Initiators and Polymerizable Compositions", PCT Publication No. WO 01/44311 A1, U.S. Ser. No. 09/466,321, herein incorporated by reference.

Mechanical fasteners such as rivets, nuts and bolts, welds, and the like may be used in conjunction with the adhesive to secure the components together.

While other adhesive families are contemplated as well (e.g., urethanes, silanes, or the like), preferably the adhesive is an epoxy resin, a phenolic resin, a polyimide, a hi-bred polyimide/epoxy resin adhesive, a high temperature acrylic resin, or an epoxy novolac/nitrile rubber adhesive. High temperature acrylic resin adhesive means an adhesive wherein the primary component is an acrylic resin which when cured can withstand exposure to the temperatures mentioned above without decomposing or delaminating from the substrate.

The plastic component of the present invention may include a thermoplastic, a thermoset, a rubber, an elastomer, and combinations thereof. Reinforced, un-reinforced, filled and unfilled plastics may also be used for each component.

Suitable thermoplastics include polybutylene terephthalate, polyetherimides, polyphenylene ether/polyamide resins, polyether sulfone resins, polyether ether ketone resins, liquid crystal polymers, polyarylsulfone resins, polyamideimide resins, polyphthalimide resins, nylon 6,6, polyamide resins, syndiotactic polystyrene, co-polymers thereof and blends or alloys thereof. In a particular preferred embodiment, the component is made of a thermoplastic selected from polyamides, polystyrenes, polyesters, vinyls, acrylics, methacrylics, acrylonitriles, polyolefins, polycarbonates, or mixtures thereof. More preferably, the material is selected from polyamides (e.g., nylon 6,6), polystyrenes or mixtures thereof. In one preferred embodiment, the material is a blend of polyamides and syndiotactic polystyrenes, and more preferably a blend of nylon 6,6 and syndiotactic polystyrene.

Among useful thermoset materials are unsaturated polyesters, polyurethane, polyimide resins, phenolic resins, diallyl phthalate resins, silicone resins, and epoxy resins. In another preferred embodiment, the thermoset is an epoxy resin.

Suitable rubbers include natural and synthetic rubbers including acrylate type rubbers, acrylic rubbers, butadiene rubbers, butadiene-acrylonitrile copolymer rubbers, butadiene-styrene copolymer rubbers, isoprene rubbers, thiol rubbers, combinations thereof, or other synthetic rubbers. Useful elastomers include fluoroelastomers, polyisoprene, polybutadiene, polyisobutylene, polyurethanes, combinations thereof, and others.

In another preferred embodiment, the component (e.g., a valve cover) is formed of blow-molded nylon or a blow molded blend of a nylon and a syndiotactic polystyrene. In a highly preferred embodiment, the nylon may be modified with up to about 10% by weight filler or reinforcement (e.g., glass, surface treated glass, mineral or combinations thereof, such as glass and mineral filled), more preferably about 10% to about 50% by weight filler or reinforcement and most preferably 18% to about 40% (e.g., about 30%) by weight filler or reinforcement or more for increasing the impact resistance or otherwise modifying the properties of the component.

The second component may be a metal (e.g., cast iron, steel, magnesium, aluminum, titanium, nickel, or the like), an alloy, a composite, a ceramic (e.g., a carbide, a nitride, a boronitride, a combination thereof, or the like), or some other material. In a preferred embodiment, the second component is a plastic as described above. More preferably, the second component is made of the same material as the plastic component.

One or more suitable agents (e.g., optical brighteners such as whiteners, fluorescence agents, colorants, combinations thereof, or the like) may be provided in the adhesion promoter for assisting in determining where on a component the adhesion promoter has been applied. Preferably, the brightener will include a component that is detectable or visible when exposed to certain types of electromagnetic waves (e.g., light, UV radiation and the like). Examples of optical brighteners include benzoxasols, thiophenates, combinations thereof, and the like. Examples of preferred optical brighteners include 4,4'-bis(benzoxazol-2-yl)stilbene, 2,5-(di-5-tert-butylbenzoyl)thiophenate, 2,2'-(1,2-Ethenediyldi-4,1-phenylene)bisbenzoxazole, and combinations thereof. One highly preferred optical brightener is a stillbene agent, such as UVITEX OB, commercially available from Ciba Specialty Chemicals, Switzerland.

Optionally, carbon black or another agent may also be added to the adhesion promoter to modify one or more of the rheological properties of the adhesion promoter, such as viscosity, sag resistance, flow rate, or otherwise. When carbon black is employed, it is preferably used in an amount of at least about 0.5 percent, more preferably at least about 1.0 percent, and most preferably at least about 2.0 percent; and is preferably no greater than about 5.0 percent, more preferably no greater than about 4.0 percent, and most preferably no greater than about 3.0 percent.

Other fillers and additives which may also be used to modify the rheological or other properties of the adhesion promoter include, for example, surface-treated fumed silicas, titanium dioxide, calcium carbonate, talc, defoaming agents, mica, aluminum oxide, clays, and glass phenolic, or aluminum oxide bubbles. Such fillers and additives are preferably anhydrous, or dried before use in order to prevent the reaction of any moisture present with the isocyanate. When talc is added it is preferably used in an amount of at least about 3 percent, and more preferably at least about 5 percent; and is preferably no greater than about 9 percent, and more preferably no greater than about 7 percent, based on the weight of the total adhesion promoter formulation.

For use, the first and second portions of the adhesion promoter are mixed with the solvent and dissolved in the solvent in the most preferred embodiment. In the preferred embodiment, the ratio of the first portion to the second portion is between approximately 7:1 and approximately 1:4, more preferably between approximately 3:1 and approximately 4:3. In one embodiment, the amount of the first portion comprises about 10 to about 70 percent by weight, preferably about 40 to about 60 percent by weight, and more preferably about 50 percent by weight. The second portion comprises about 10 to about 40 percent by weight, preferably about 20 to about 30 percent by weight, and more preferably about 20 percent by weight. The solvent can comprise about 20 to about 50 percent by weight, preferably about 30 to about 40 percent by weight, and more preferably about 30 percent by weight. The solvent and the second portion can be mixed in a container. Preferably, the solvent and the second portion are mixed between about 1 and about 10 minutes, and more preferably about 2 minutes. After the second portion is properly mixed (e.g. dissolved) with the solvent, the first portion is mixed with the solution and placed on a roller and rolled until the mixture becomes a clear solution, e.g. the first and second portion are dissolved in the solvent. Preferably, the mixture is rolled for between about 2 to about 3 hours.

The adhesion promoter is applied to the mating surface of the plastic component by any suitable method (e.g. spraying, brushing, rolling, dipping, swabbing, and combinations thereof). The adhesion promoter is dried by heating, exposure to ambient conditions, and other drying methods known to the skilled artisan. Preferably, the adhesion promoter is dried at ambient conditions for about 30 minutes. After the adhesion promoter dries, the adhesive is applied to the surface treated mating surface. The adhesive is timely applied over the adhesion promoter such that moisture in the air does not degrade the adhesion promoter. Preferably, the adhesive is applied within about 8 hours, within about 4 hours, within about 1 hour, within about 30 minutes, within about 15 minutes, within about 10 minutes and within about 5 minutes of drying of the adhesion promoter. Typically, the plastic component is then attached to the second component and the adhesive is cured as desired.

In one embodiment, the surfaces of the components can optionally undergo a preliminary treatment prior to the application of the adhesion promoter of the present invention. This optional treatment can include cleaning and degreasing, plasma coating, coating with another surface treatment, and combinations thereof. In one embodiment, a component may include a coating or film separate from the adhesion promoter disclosed herein on the exterior or interior which functions to improve overall performance of the assembly, such as a carbon-silica based plasma deposited coating, e.g., as described in U.S. Pat. Nos. 5,298,587; 5,320,875; 5,433,786 and 5,494,712, all hereby incorporated herein by reference. Other surface treatments might also be employed such as plasma surface treatment pursuant to art disclosed teachings as found in U.S. Pat. No. 5,837,958, incorporated herein by reference.

The present invention also relates to methods of adhesively bonding two or more components together. Such methods include suitably combining a first portion and a second portion in a solvent to form an adhesion promoter, applying an adhesion promoter to at least one plastic component and applying an adhesive to form a joint between the plastic component and a second component. The methods also including drying the adhesion promoter using ambient conditions and applying the adhesive within about 8 hours of the drying of the adhesion promoter.

present invention also relates to methods of using assemblies of components that include a joint that has been prepared using the adhesion promoters disclosed herein. In particular, the methods include operating a vehicle engine at conditions above about 138° C., more preferably up to about 143° C., even more preferably up to about 160° C., and most preferably up to about 191° C., where the joint of the component includes the materials of the adhesion promoter.

It will be further appreciated that functions of a plurality of components or steps may be combined into a single component or step, or the functions or structures of one step or component may be split among plural steps or components. The present invention contemplates all of these combinations. Unless stated otherwise, dimensions and geometries of the various structures depicted herein are not intended to be restrictive of the invention, and other dimensions or geometries are possible. Plural structural components or steps can be provided by a single integrated structure or step. Alternatively, a single integrated structure or step might be divided into separate plural components or steps. In addition, while a feature of the present invention may have been described in the context of only one of the illustrated embodiments, such feature may be combined with one or more other features of other embodiments, for any given application. It will also be appreciated from the above that the fabrication of the unique structures herein and the operation thereof also constitute methods in accordance with the present invention.

The explanations and illustrations presented herein are intended to acquaint others skilled in the art with the invention, its principles, and its practical application. Those skilled in the art may adapt and apply the invention in its numerous forms, as may be best suited to the requirements of a particular use. Accordingly, the specific embodiments of the present invention as set forth are not intended as being exhaustive or limiting of the invention. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes.

What is claimed is:

1. A bonded automotive vehicle assembly, comprising:
    at least one plastic component;
    an adhesive for bonding the plastic component to at least one second component; and
    an adhesion promoter between the adhesive and the plastic component, comprising at least:
        a polyhydroxy compound;
        a hydroxyalkyl methacrylate monomer; and
        an anhydrous solvent.

2. The assembly of claim 1 wherein the hydroxyalkyl methacrylate monomer is present in the adhesion promoter from about 20 wt. % to about 30 wt. %.

3. The assembly of claim 2, wherein the polyhydroxy compound is a difuctional aromatic compound.

4. The assembly of claim 3, wherein the difunctional aromatic compound is resorcinol, wherein the resorcinol, and the resorcinol is present form about 40 to about 60% by weight of the adhesion promoter.

5. The assembly of claim 1, wherein the hydroxyalkyl methacrylate monomer comprises 2-hydroxyethyl methacrylate.

6. The assembly of claim 4, wherein the hydroxyalkyl methacrylate monomer is 2-hydroxyethyl methacrylate.

7. The assembly of claim 1, wherein
    i) the polyhydroxy is present at a concentration from about 40 to about 60 wt %,
    ii) the hydroxyalkyl methacrylate monomer is present at a concentration from about 20 to about 30 wt %, and
    iii) the solvent is present at a concentration from about 20 to about 50 wt %.

8. The assembly of claims 1, wherein the solvent is selected from the group consisting of anhydrous methanol, anhydrous ethanol, anhydrous propanol, anhydrous isopropyl alcohol, anhydrous butanol, and any combination thereof, wherein the solvent is present at a concentration from about 20 wt. % to about 50 wt. % based on the total weight of the adhesion promoter.

9. The assembly of claims 1, wherein the solvent is present at a concentration from about 20 wt. % to about 50 wt. % based on the total weight of the adhesion promoter.

10. The assembly of claims 1, wherein the hydroxyalkyl methacrylate monomer is present from about 10 to about 40 wt. % based on the total weight of the adhesion promoter, and the ratio of polyhydroxy compound to hydroxyalkyl methacrylate monomer is between about 3:1 and about 4:3.

11. The assembly of claims 1, wherein the plastic component comprises reinforced nylon.

12. The assembly of claims 1, wherein the polyhydroxy compound includes resorcinol; the hydroxyalkyl methacrylate monomer includes 2-hydroxyethyl methacrylate and the adhesion promoter includes
    i) the resorcinol at a concentration from about 10 to about 70 wt %,
    ii) the 2-hydroxyethyl methacrylate monomer at a concentration from about 10 to about 40 wt %, and
    iii) from about 20 to about 50 wt % of an anhydrous ethanol.

13. The assembly of claims 1, wherein the adhesive comprises an acrylic resin.

14. The assembly of claims 12, wherein the adhesive comprises an epoxy adhesive.

15. A bonded automotive vehicle engine assembly, comprising:
    at least one plastic intake manifold component;
    an adhesive for bonding the intake manifold component to at least one different component; and
    an adhesion promoter between the adhesive and the plastic intake manifold component, comprising at least:
    resorcinol; and
    hydroxyethyl (meth)acrylic monomer.

* * * * *